US012404108B2

(12) United States Patent
Smith et al.

(10) Patent No.: US 12,404,108 B2
(45) Date of Patent: Sep. 2, 2025

(54) APPARATUS AND METHODS FOR TRANSFERRING FRAGILE ITEMS AT SELECTIVELY VARIABLE FLOW RATES

(71) Applicant: TriDelta Systems, LLC, Abbeville, AL (US)

(72) Inventors: Benjamin Decker Smith, Abbeville, AL (US); Michael Pierce Woodall, Headland, AL (US)

(73) Assignee: TriDelta Systems, LLC, Abbeville, AL (US)

( * ) Notice: Subject to any disclaimer, the term of this patent is extended or adjusted under 35 U.S.C. 154(b) by 148 days.

(21) Appl. No.: 18/403,301

(22) Filed: Jan. 3, 2024

(65) Prior Publication Data

US 2024/0140716 A1    May 2, 2024

Related U.S. Application Data

(63) Continuation-in-part of application No. 17/543,188, filed on Dec. 6, 2021, now Pat. No. 12,012,295.

(51) Int. Cl.
| | |
|---|---|
| *B65G 11/08* | (2006.01) |
| *B65G 47/12* | (2006.01) |
| *B65G 49/05* | (2006.01) |

(52) U.S. Cl.
CPC ............ *B65G 11/088* (2013.01); *B65G 49/05* (2013.01); *B65G 2201/0202* (2013.01)

(58) Field of Classification Search
CPC ....... B65G 11/20; B65G 11/08; B65G 11/081; B65G 11/083; B65G 11/085; B65G 11/086; B65G 11/088; B65G 47/12; B65G 49/05; G01F 1/30

USPC ............................................. 193/27; 198/577
See application file for complete search history.

(56) References Cited

U.S. PATENT DOCUMENTS

| | | | |
|---|---|---|---|
| 260,104 A | 6/1882 | Lidford | |
| 707,297 A | 8/1902 | Brink | |
| 969,372 A | 9/1910 | Hottel | |
| 3,710,919 A * | 1/1973 | Maters ................. | B65G 47/682 198/453 |
| 6,259,967 B1 * | 7/2001 | Hartlepp ............ | B65G 47/1492 198/444 |

(Continued)

FOREIGN PATENT DOCUMENTS

WO    WO-2024216387 A1 *    10/2024    ........... B65G 11/206

OTHER PUBLICATIONS

US 2015/0259143 A1, Tse et al., Sep. 17, 2015.*

*Primary Examiner* — Douglas A Hess
(74) *Attorney, Agent, or Firm* — Dorton & Willis, LLP

(57) ABSTRACT

An apparatus for vertical transfer of whole nuts from a first elevation to a second, lower elevation includes a run extending between an entrance and an exit, and having a plurality of alternatingly arranged conveying panels between the entrance and the exit. Each conveying panel is inclined to horizontal and has a variable effective conveying width. The apparatus further includes arcuate turn-arounds disposed between respective conveying panels to facilitate transferring the nuts from one conveying panel to the next lower conveying panel. The variable effective conveying width is selected based on a predetermined mass flow rate of nuts such that whole nuts move along the run in a continuous stream without tumbling, and wherein each nut is in contact with adjacent nuts in its respective layer.

5 Claims, 6 Drawing Sheets

(56) References Cited

U.S. PATENT DOCUMENTS

| | | |
|---|---|---|
| 7,743,927 B2 | 6/2010 | Svatek et al. |
| 9,334,119 B2 * | 5/2016 | Takasugi ............... B65G 11/206 |
| 9,492,849 B2 | 11/2016 | Adams et al. |
| 9,958,301 B2 | 5/2018 | Kirk et al. |
| 10,647,526 B1 * | 5/2020 | Mohammed ........... B65G 13/11 |
| 11,655,105 B2 * | 5/2023 | Smith .................... B65G 47/12 |
| | | 414/814 |
| 12,012,295 B2 * | 6/2024 | Smith .................. B65G 11/206 |

\* cited by examiner

APPARATUS AND METHODS FOR TRANSFERRING FRAGILE ITEMS AT SELECTIVELY VARIABLE FLOW RATES

CROSS-REFERENCE TO RELATED APPLICATIONS

This Application is a continuation-in-part of U.S. patent application Ser. No. 17/543,111, filed Dec. 6, 2021 (pending), and is related to U.S. patent application Ser. No. 17/084,178, filed Oct. 29, 2020, now U.S. Pat. No. 11,655,105, the disclosures of which are incorporated by reference herein in their entirety.

TECHNICAL FIELD

The present invention relates generally to conveying systems and, more particularly, to apparatus and methods for transferring fragile items from a first elevation to a second, lower elevation.

BACKGROUND

Various machines and devices have been developed to facilitate harvesting and processing agricultural products such as nuts. Many such apparatus have been developed to facilitate transferring agricultural products from a first elevation to a second, lower elevation utilizing gravity. When the product to be transferred is fragile, special care must be taken to ensure that the product is not damaged during handling. For example, there is a particular market for whole nuts, such as whole peanuts, where it is important that the nuts be maintained in their whole form. One such application where whole nuts may be required is for use in the candy-making industry, for example. If nuts intended for making certain candies are split or otherwise damaged, the product loses value and cannot be used for the desired application. Accordingly, special care must be taken during the handling and transport of whole nuts to prevent such damage. Special care is also required for transporting and processing various other items. As non-limiting examples, various foodstuffs and wood pellets used for heating are fragile items that require special care during transport and handling to ensure that the items are not broken or otherwise damaged.

The need to maintain nuts or other fragile items in their whole form is counterbalanced, on the other hand, with the need to quickly and efficiently transport and feed the items through the associated handling and processing equipment. Conventional systems for transferring whole nuts from a first elevation to a second, lower elevation using gravity have typically involved spiral ramps that convey the product between the first and second elevations. These spiral ramp transfer devices are prone to becoming blocked with product if mass flow rates through the device are too high, thereby limiting the effective through-flow that these types of devices can achieve. Moreover, increasing mass flow through spiral ramp-type transfer devices generally requires increasing the diameter of the spiral, which may be prohibited by existing space limitations. In other applications, devices incorporating alternating panels to transfer product between the first and second elevations have been used. While attempts have been made to utilize alternating panel devices for transferring whole nuts, such as peanuts, these devices have not generally been considered to be effective for transferring whole nuts without splitting or otherwise damaging the nuts. In particular, alternating panel-type devices generally exhibit flow stoppages when the angle of inclination of the panels relative to horizontal is about 35 degrees or less, whereas splitting and other damage to the nuts occurs due to abrupt turns where sufficient velocities and angles of impact occur.

In some applications, it may be desirable to transfer fragile items, such as whole nuts, between elevations at selectively variable flow rates while ensuring that the items are not broken or otherwise damaged. For example, some applications or processes may require the fragile items to be provided at a first mass flow rate, whereas other applications or processes may require the fragile items to be provided at a second mass flow rate that is higher or lower than the first mass flow rate. If the apparatus used for transferring the fragile items at the first mass flow rate was configured to also accommodate transferring the fragile items at the second mass flow rate, all while ensuring that the items are not broken or otherwise damaged, then the need for separate machines adapted for each individual flow rate could be avoided.

A need therefore exists for an improved transfer device that moves fragile products, such as whole nuts, at selectively variable flow rates quickly and efficiently, but which reduces or eliminates splitting or otherwise breaking or damaging the fragile products.

SUMMARY

The present invention provides apparatus and methods for quickly and efficiently transferring fragile items, such as whole nuts, from a first elevation to a second, lower elevation, at selectively variable flow rates while maintaining the integrity of the fragile products. While the apparatus and methods are described herein with particular reference to whole peanuts as the items being transferred, it will be appreciated that the apparatus and methods may alternatively be used to transfer various other fragile items from a first elevation to a second, lower elevation.

In one aspect, an apparatus for vertical transfer of whole nuts from a first elevation to a second, lower elevation includes a run extending between an entrance and an exit, and having a plurality of alternatingly arranged conveying panels between the entrance and the exit. Each conveying panel may be inclined relative to horizontal, and has a variable effective conveying width. The apparatus further includes arcuate turn-arounds disposed between respective conveying panels to facilitate transferring the nuts from one conveying panel to the next lower conveying panel. The variable effective conveying width of the conveying panels is selected based on a pre-determined mass flow rate of nuts such that whole nuts move along the run in a continuous stream without tumbling, and wherein each nut is in contact with adjacent nuts in its respective layer.

In one embodiment, each conveying panel may have an undulating cross-sectional shape along at least part of the panel length in a direction of the run, the undulating cross-sectional shape forming peaks and troughs that define at least one channel for transferring the continuous stream of nuts. The at least one channel of the conveying panel defines at least part of the variable effective width. The apparatus may further include first and second oppositely disposed sidewalls adjacent lateral sides of the conveying panels.

In another aspect, a method for vertically transferring whole nuts from a first elevation to a second, lower elevation includes providing whole nuts to a transfer apparatus having a run extending between an entrance and an exit, and including a plurality of alternatingly arranged conveying panels between the entrance and exit. Each conveying panel is inclined relative to horizontal and has a variable effective conveying width. The variable effective conveying width is selected based on a predetermined mass flow rate of nuts such that whole nuts move along the run in a continuous stream without tumbling, and wherein each nut is in contact with adjacent nuts in its respective layer. Each conveying panel may further have an undulating cross-sectional shape along at least part of the panel length in a direction of the run, wherein the undulating cross-sectional shape forms peaks and troughs that define at least one channel for transferring the continuous stream of nuts. The at least one channel may define at least part of the variable effective conveying width.

In another aspect, the apparatus may further include a sensor engaging the run and supporting at least part of the weight of the apparatus. The sensor is configured to detect a force related to product moving along the run, whereby the mass flow of nuts being transferred by the apparatus may be determined based on the detected force. In another aspect, a method of vertically transferring whole nuts from a first elevation to a second, lower elevation includes providing whole nuts to a transfer apparatus having a run extending between an entrance and an exit, and including a plurality of alternatingly arranged conveying panels between the entrance and exit, each conveying panel inclined relative to horizontal and having a variable effective conveying width. The variable effective conveying width is selected based on a pre-determined mass flow rate of nuts such that whole nuts move along the run in a continuous stream without tumbling, and wherein each nut is in contact with adjacent nuts in its respective layer.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the present invention.

DETAILED DESCRIPTION

Figure 1:
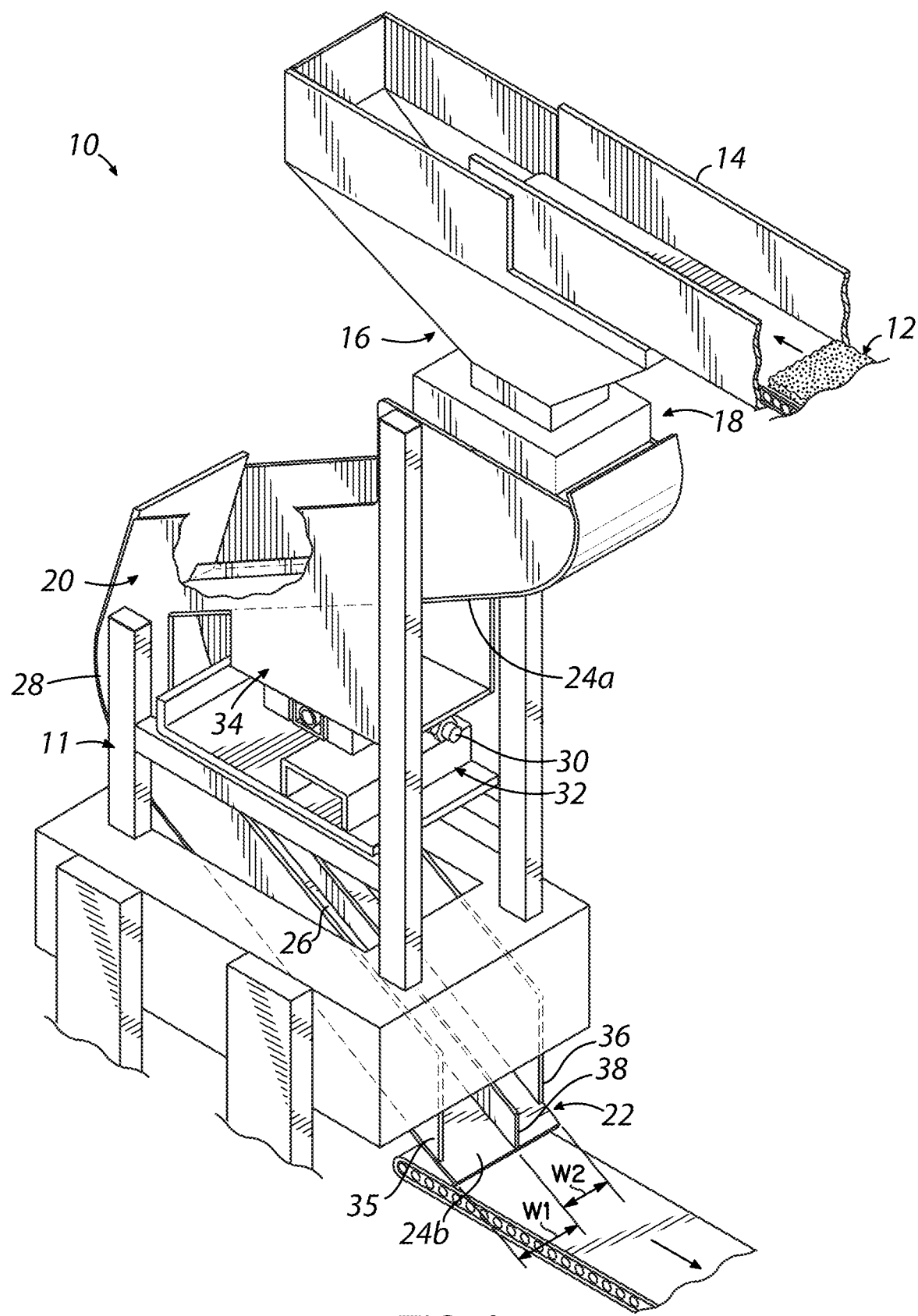
FIG. 1 is a perspective view of an exemplary apparatus for transferring whole nuts at selectively variable flow rates from a first elevation to a second, lower elevation in accordance with the principles of the present disclosure.

FIG. 1 depicts an exemplary apparatus 10 for transferring fragile items from a first elevation to a second, lower elevation in accordance with the principles of the present disclosure. The apparatus 10 is particularly useful for transferring whole nuts, such as whole peanuts. It will be appreciated, however, that the apparatus 10 may alternatively be used to transfer other fragile items and, while the discussion herein references peanuts, the principles of this disclosure are applicable to various other fragile items as well. The exemplary apparatus 10 is depicted in FIG. 1 in a typical installation within a processing plant where it may be supported, at least in part, by framework 11 within the plant. In the embodiment shown, whole nuts 12 are received from a supply and directed by an infeed conveyor 14 into a hopper 16 positioned adjacent an entrance 18 of the transfer apparatus 10, whereby a substantially constant feed of whole nuts 12 may be directed into the entrance 18 of the transfer apparatus 10 from the hopper 16. The transfer apparatus 10 includes a run 20 that extends between the entrance 18 and an exit 22 provided at the second elevation. The run 20 includes several alternatingly arranged conveying panels 24a, 24b upon which the nuts 12 are transferred from the first elevation to the second elevation under the force of gravity. The conveying panels 24a, 24b have a generally planar conveying surface 26 upon which the nuts 12 are received near an upper portion thereof, and are inclined relative to horizontal so that the nuts 12 slide down the conveying surface 26 under the influence of gravity toward a lower portion, whereafter the nuts 12 are directed to the next lower conveying panel 24b.

The apparatus 10 further includes one or more turnarounds 28 disposed between successively positioned conveying panels 24a, 24b so that nuts 12 leaving the lower portion of one conveying panel 24a are engaged by the turnaround 28 and are directed onto the upper portion of the next lower conveying panel 24b. The transfer apparatus 10 may have additional turnarounds 28 and conveying panels 24a, 24b, as may be suitable to achieve a desired transfer height, as discussed more fully below. In the embodiment shown, the turnaround 28 transitions directly into the next successive conveying panel 24b. It will be appreciated, however, that turnarounds may alternatively comprise separate components that are joined with or positioned adjacent the next successive conveying panel.

Transfer apparatus in accordance with the principles of the present disclosure may be fabricated using any suitable material. In some embodiments, the transfer apparatus, including the conveying panels and turnarounds, may be formed from mild steel, which facilitates manufacture of the transfer apparatus using conventional manufacturing methods. In other embodiments, applications may require the use of particular material. For example, stainless steel may be used to fabricate a transfer apparatus intended for use with food products. Various other materials may be used as will be appreciated by persons skilled in the art.

With continued reference to FIG. 1, the transfer assembly 10 may further include at least one sensor 30 positioned to engage the run 20 and supporting at least part of the weight of the transfer apparatus 10. In the embodiment shown, the sensor 30 is fixed to the framework 11 by suitable support structure 32, and engages the run 20 through a bracket assembly 34. The sensor 30 is configured to detect a force related to the mass of items moving along the run 20, whereby the mass flow rate of items, such as whole peanuts 12, though the transfer apparatus 10 can be determined. For example, the sensor 30 may be configured to detect a net vertical force on the apparatus 10 due to the mass of items moving along the run 20.

Through experimentation with runs of different configurations and having conveying panels arranged at different inclinations, the inventors discovered that the mass flow rate of whole nuts moving along the run can be increased without splitting or otherwise damaging the whole nuts when the nuts are moved by gravity in a continuous stream without gaps between individual nuts and without tumbling, such that each nut is in contact with respective nuts adjacent to it. It was further discovered that whole peanuts could be moved along a run having conveying panels inclined at about 30 degrees at an average speed of about 300 feet/minute while staying together in a continuous stream without tumbling, thereby maintaining the whole condition of the peanuts. The average speed of 300 feet/minute was thus determined to be the optimum speed for transferring whole peanuts in a continuous stream without damaging the peanuts. In a similar manner, the optimum speed for transferring other items can be experimentally determined by transferring the items at different speeds and observing the transferred items with respect to quality, such as whether the item has incurred damage.

In the exemplary embodiment of FIG. 1, each conveying panel 24a, 24b is inclined in a lengthwise direction (e.g., aligned with the direction of material flow along the run) at an angle with respect to horizontal of approximately 30 degrees. As used herein, approximately 30 degrees takes into consideration that the actual angle may vary slightly due to manufacturing tolerances and/or the positioning of the transfer apparatus 10 within the particular application in which it is used. The conveying panels 24a, 24b are configured to provide a variable effective conveying width that is selected based upon a desired mass flow rate of whole nuts 12, such that the whole nuts 12 move along the run 20 in a continuous stream without tumbling, and wherein each nut 12 is in contact with adjacent nuts 12 in its respective layer. The desired conveying width of conveying panels 24a, 24b in the run 20 can thus be determined to achieve a desired mass flow rate of nuts 12 once the optimum speed for transferring the nuts 12 without splitting or otherwise causing damage has been determined. The conveying width W of the conveying panels 24a, 24b for the transfer apparatus 10 can be determined from the equation:

$$W = \frac{Q}{\rho * S * H}$$

wherein:
W is the effective conveying width of the conveying panels;
Q is the desired mass flow rate of nuts;
ρ is the density of the nuts being transferred;
S is the optimum speed for the nuts being transferred; and
H is the height of nuts in the continuous stream.

For example, when the desired mass flow rate for transferring peanuts (density=35 lb/cubic foot) with a stream height of 1 inch is 2000 pounds/minute, the conveying width of the conveying panels is determined to be:

$$W = \frac{\left(2000 \frac{\text{lb}}{\text{min}}\right)}{\left(35 \frac{\text{lb}}{\text{ft3}}\right) * \left(300 \frac{\text{ft}}{\text{min}}\right) * \left(1 \text{ in} * \frac{1 \text{ ft}}{12 \text{ in}}\right)}$$

$$W = 2.286 \text{ feet } (27.4 \text{ inches})$$

Figure 2:
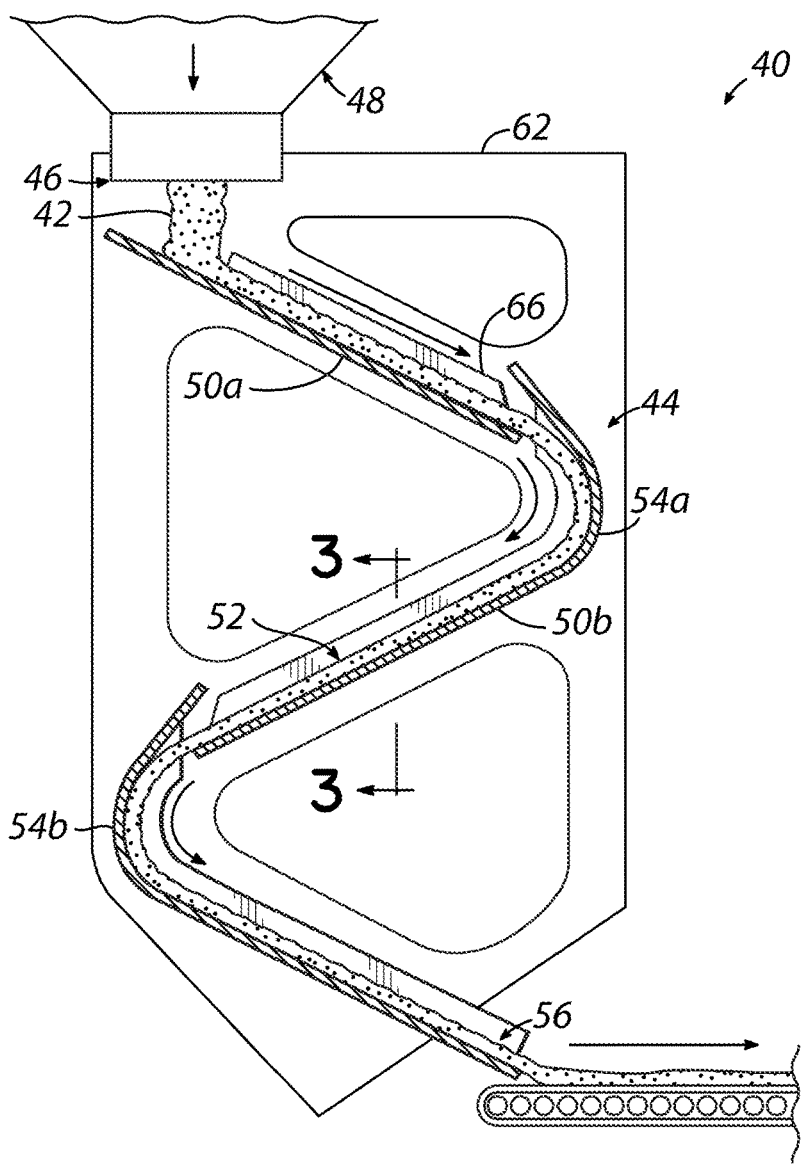
FIG. 2 is cross-sectional view of another exemplary transfer apparatus, illustrating operation to transfer whole nuts.

FIG. 2 depicts an exemplary transfer apparatus 40 in cross-section and illustrates operation of the apparatus 40 to move whole nuts 42 along the run 44 from the first elevation to the second elevation. A steady supply of whole nuts 42 is provided to the entrance 46 of the run 44 from a hopper 48 and is received proximate an upper portion of a first conveying panel 50a. The first conveying panel 50a is inclined relative to horizontal so that the whole nuts 12 are moved under the force of gravity down the generally planar conveying surface of the conveying panel 50a in a continuous stream 52 without gaps between individual nuts 42 and without tumbling. At the lower portion of the first conveying panel 50a, the stream 52 of whole nuts 42 is transferred into engagement with a first turnaround 54a disposed adjacent the lower portion of the first conveying panel 50a. The first turnaround 54a has a generally arcuate shape and is configured to receive the continuous stream 52 of nuts 42 such that the surface of the turnaround 54a engages the stream 52 of nuts 42 substantially along a tangent to the moving stream 52 and gently turns the stream 52 toward a second conveying panel 50b having an inclination in a direction opposite that of the first conveying panel 50a. The continuous stream 52 of nuts 42 then moves down the second conveying panel 50b under the force of gravity until it is in turn transferred into engagement with a second turnaround 54b disposed adjacent the lower portion of the second conveying panel 50b in the same manner as described above.

Figure 3:
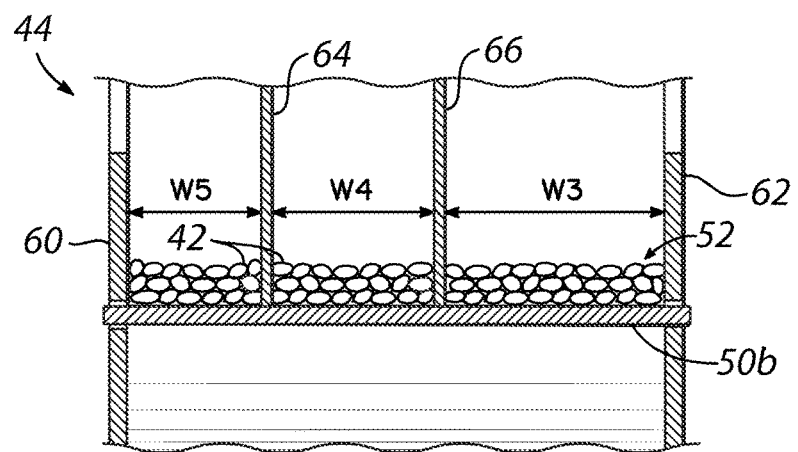
FIG. 3 is a section view taken along line 3-3 of FIG. 2.

By engaging the stream 52 of nuts 42 substantially along a tangent to the direction of travel, the turnaround 54a slows the stream 52 and effectively limits the speed and impact forces on the nuts 42. In one embodiment, the turnarounds 54a, 54b have a radius of curvature of approximately 6 inches when the items being transferred are whole peanuts. FIG. 3 further illustrates, in a cross-section transverse to the flow along the run 44, the continuous stream 52 comprising several layers of whole nuts 42 moving along the conveying panel 50b. It has been observed that a continuous stream 52 of whole nuts 42 can be transferred along the run when the stream 52 comprises one to about five layers of nuts 42, without creating gaps between the nuts 42.

Additional conveying panels and turnarounds may be provided as may be desired in order to transfer whole nuts 42 from the first elevation to the second elevation, whereafter the nuts 42 are directed through the exit 56 of the run 44. It has been observed that, with sufficient inclination of the conveying panels 50a, 50b, a continuous stream 52 of whole nuts 42 moving along the run 44 of a transfer apparatus 40 in accordance with the present disclosure will increase in speed until a maximum speed is reached; effectively achieving a "terminal velocity" of the continuous stream 52 of nuts 42. Advantageously, a transfer apparatus 10, 40 according to the present disclosure may be configured to accommodate a given transfer height though proper selection of the number of conveying panels 24a, 24b, 50a, 50b and turnarounds 28, 54a, 54b.

To facilitate maintaining the stream 52 of whole nuts 12, 42 in contact with one another as the nuts 12, 42 are transferred between the first elevation and the second elevation, the transfer apparatus 10, 40 further includes first and second oppositely disposed sidewalls 35, 36, 60, 62 adjacent the lateral sides of the conveying panels 24a, 24b, 50a, 50b, as illustrated in FIGS. 1-3 for example. With continued reference to FIGS. 1-3, the transfer apparatus 10, 40 further includes at least one intermediate wall disposed between the first and second sidewalls to thereby define at least one effective conveying width therebetween. In the embodiment shown in FIG. 1, the transfer apparatus 10 includes a single intermediate 38 wall provided along the run 20 and defining first and second effective conveying widths W1, W2. The first effective conveying width W1 is defined by the spacing between the first sidewall 35 and the intermediate wall 38, and is selected to provide a first predetermined mass flow rate of nuts. Likewise, the second effective conveying width W2 is defined by the spacing between the second sidewall 36 and the intermediate wall 38, and is selected to provide a second predetermined mass flow rate of nuts. As nuts 12 are received into the entrance 18 of the transfer apparatus 10, they may be directed between the first sidewall 35 and the intermediate wall 38, such that the nuts 12 are transferred at the first mass flow rate. To transfer nuts 12 at a higher mass flow rate, the nuts 12 may be directed not only between the first sidewall 35 and the intermediate wall 38, but also between the intermediate wall 38 and the second sidewall 36, whereby a higher mass flow rate is achieved as a combination of the first and second predetermined mass flow rates.

While FIG. 1 illustrates an embodiment of a transfer apparatus 10 having a single intermediate wall 38, it will be appreciated that other embodiments may have two or more intermediate walls to thereby define several effective conveying widths along the same run, whereby incrementally increasing levels of mass flow rates may be achieved in a single transfer apparatus. As a nonlimiting example, FIG. 3 illustrates an exemplary embodiment of a transfer apparatus 40 in accordance with the principles of the present disclosure wherein two intermediate walls 64, 66 are disposed between sidewalls 60, 62 such that three effective conveying widths W3, W4, W5 are defined along the run 44. Accordingly, when a relatively lower mass flow rate is needed, nuts 42 may be directed only into the space between the second sidewall 62 and the second intermediate wall 66 whereby the first effective conveying width W3 defines the first mass flow rate. As relatively higher mass flow rates are required, nuts 42 may also be selectively directed into the spaces between the first and second intermediate walls 64, 66, and further into the space between the first intermediate wall 64 and the first sidewall 60 to thereby additively increase the total mass flow rate according to the second and third effective conveying widths W4, W5.

Figure 4:
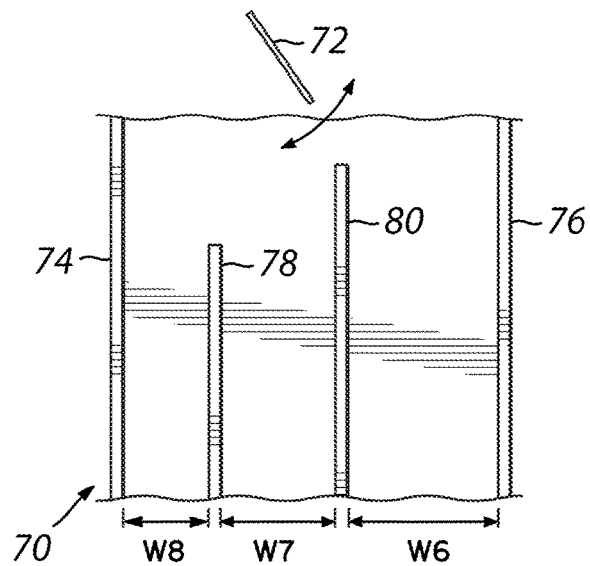
FIG. 4 is a partial detail view of a run section of another exemplary apparatus, similar to FIG. 3, illustrating one embodiment providing a variable effective conveying width in accordance with the principles of the present disclosure.

FIG. 4 depicts an embodiment of a transfer apparatus 70 similar to FIG. 3, which further includes a gate 72 positioned and arranged to facilitate directing nuts into spaces defined by the first and second sidewalls 74, 76 and first and second intermediate walls 78, 80 so as to achieve selectively increasing mass flow rates. In operation, the gate 72 may be controlled to selectively direct nuts into the first conveying width W6; the first and second conveying widths W6, W7, together; or into each of the first, second, and third conveying widths W6, W7, W8, whereby the mass flow rate of transferred nuts may be selectively varied.

Figure 5:
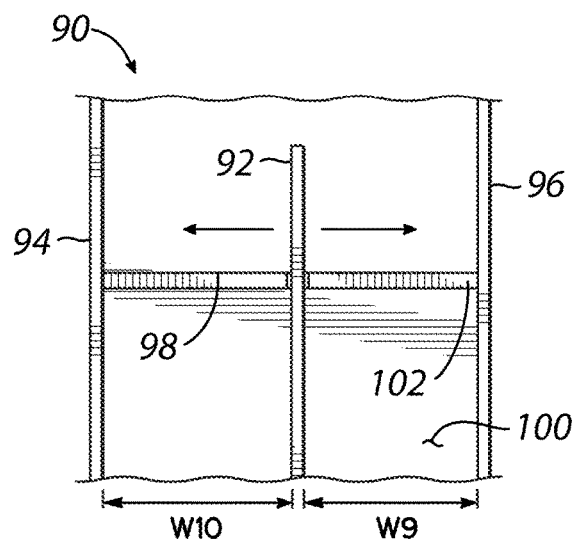
FIG. 5 is a partial detail view of a run section similar to FIG. 4, illustrating a second alternative embodiment of a transfer apparatus providing a variable effective conveying width.

FIG. 5 illustrates an exemplary embodiment of a transfer apparatus 90 wherein at least one variable effective conveying width W9, W10 may be defined by a moveable intermediate wall 92 disposed between the first and second sidewalls 94, 96. In this embodiment, the intermediate wall 92 is supported by a bracket that is slidably movable in a transversely extending slot 98 formed in the conveying panel 100 of the run, whereby the position of the moveable intermediate wall 92 between the first and second sidewalls 94, 96 may be adjusted by sliding the bracket and intermediate wall 92 along the slot 98. A backing member 102 may be provided on opposite sides of the moveable intermediate wall 92 to fill the space created by the transverse slot 98 so that nuts or other fragile items moving along the run will pass over the slot 98. Operation of the transfer apparatus 90 illustrated in FIG. 5 is generally similar to the operation of the transfer apparatus of FIGS. 1-4, wherein first and second effective conveying widths W9, W10 may be defined between the first and second sidewalls 94, 96 and the intermediate wall 92, except that the intermediate wall 92 of this embodiment is also selectively adjustably positionable between the first and second sidewalls 94, 96 to adjust the first and second effective conveying widths W9, W10 as may be desired.

Figure 6:
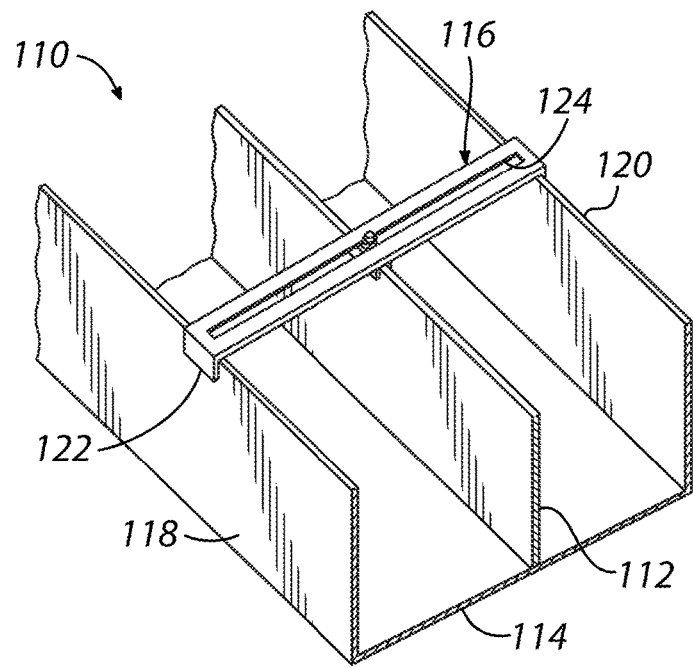
FIG. 6 is a partial perspective view illustrating a third alternative embodiment of a transfer apparatus providing a variable effective conveying width.
Figure 7:
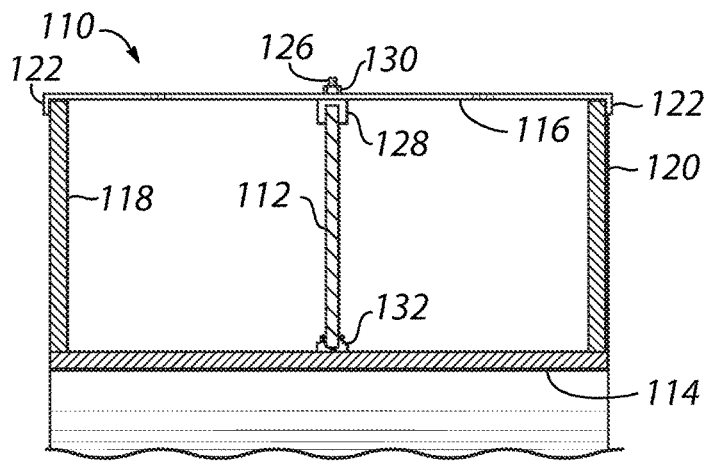
FIG. 7 is partial cross-sectional view of the transfer apparatus of FIG. 6.

Referring now to FIGS. 6 and 7, yet another exemplary embodiment of a transfer apparatus 110 having a moveable intermediate wall 112 that defines selectively variable effective conveying widths is depicted. In this embodiment, the selectively moveable intermediate wall 112 is supported between the conveying panel 114 and a guide member 116 coupled adjacent the upper ends of the first and second sidewalls 118, 120. The guide member 116 may include first and second flanges 122 provided at respective longitudinal ends to facilitate engaging the first and second sidewalls 118, 120. An elongate slot 124 extends along the length of the guide member 116 and receives a threaded member 126 of a clamp 128 therethrough. Accordingly, the intermediate wall 112 may be moved to a desired position between the first and second sidewalls 118, 120 by sliding the intermediate wall 112 to a desired position along the slot 124, whereafter the intermediate wall 112 may be secured in position by tightening a nut 130 onto the threaded member 126 of the clamp 128. As best seen in FIG. 7, an optional sealing member 132 may be provided along a bottom edge of the intermediate wall 112 to facilitate holding the intermediate wall 112 in the selected position.

Figure 8:
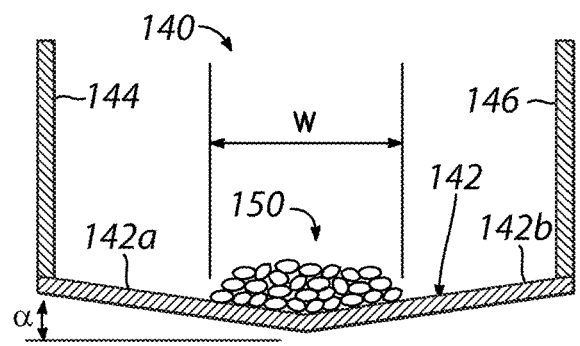
FIG. 8 is a partial cross-sectional view illustrating a fourth alternative embodiment of a transfer apparatus providing a variable effective conveying width.

FIG. 8 illustrates another exemplary embodiment of a run of a transfer apparatus 140 in accordance with the principles of the present disclosure. In this embodiment, at least a portion of the conveying panel 142 is angled in a direction that defines a decline angle α from a horizontal reference, and extending from a sidewall toward the center of the run, when viewed in a cross-section transverse to the direction of flow along the run. In the embodiment shown, portions 142a, 142b of the conveying panel 142 adjacent both sidewalls 144, 146 are angled from a horizontal reference such that a trough is formed near the center of the run. Accordingly, as nuts 150 are moved along the run, the force of gravity biases the nuts 150 in a direction toward the center of the trough, thereby defining a variable effective conveying width W that varies with the width of the stream of nuts 150 in the flow. While both portions 142a, 142b of the conveying panel 142 adjacent the first and second sidewalls 144, 146 are declined from horizontal in this embodiment, it will be appreciated that the conveying panel 142 may alternatively be declined from horizontal in a direction away from only one of the sidewalls 144, 146.

Figure 9A:
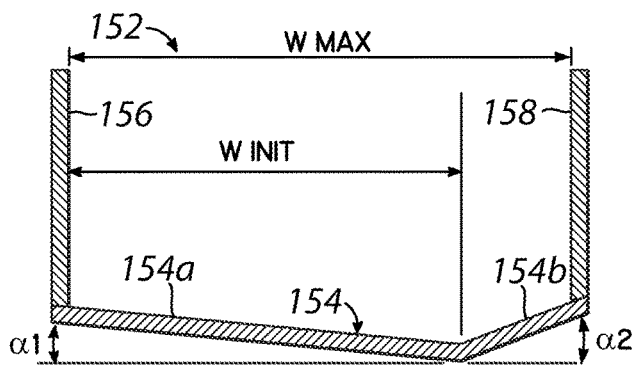
FIGS. 9A and 9B are partial cross-sectional views, similar to FIG. 8, illustrating additional alternative embodiments of transfer apparatus providing variable effective conveying widths.
Figure 9B:
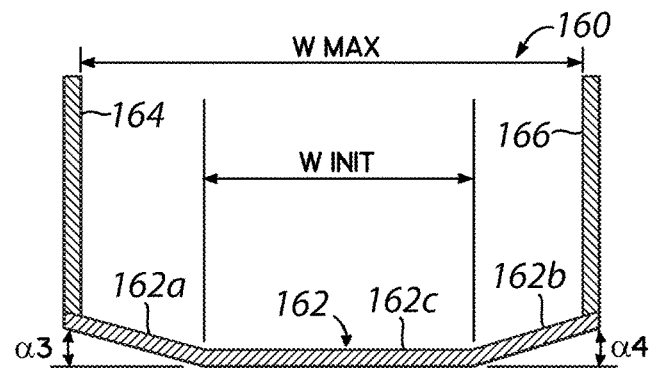

FIGS. 9A and 9B illustrate other exemplary embodiments of transfer apparatus 152, 160 wherein a variable effective conveying width is achieved in a run by angled conveying panels. In the exemplary transfer apparatus 152 illustrated in FIG. 9A, a first portion 154a of the conveying panel 154 adjacent the first sidewall 156 is declined at a first decline angle α1, whereas a second portion 154b of the conveying panel adjacent the second sidewall 158 is angled at a second decline angle α2 different from the first decline angle α1. As a result, the angled portions 154a, 154b of the conveying panel 154 define a trough with a low point that is offset from the center of the run. In this embodiment, as nuts are moved along the run, a first mass flow rate is defined by an initial effective conveying width W (INIT) as the nuts are moved along the first conveying panel portion 154a, and the width of the stream of nuts spreads over the first conveying panel portion 154a. The mass flow rate of nuts may be increased according to a varying effective conveying width as the flow of nuts gradually extends over onto the second conveying panel portion 154b, until the mass flow rate reaches a maximum defined by a maximum effective conveying width W (MAX) when the nuts eventually engage the second sidewall 158.

FIG. 9B illustrates yet another exemplary embodiment of a transfer apparatus 160 wherein a variable effective conveying width is achieved by first and second inclined portions 162a, 162b of the conveying panel 162 adjacent the first and second sidewalls 164, 166 respectively, which are connected by a generally horizontal third portion 162c of the conveying panel 162 extending therebetween. In this embodiment, an initial mass flow rate of nuts is provided by a first effective conveying width W (INIT) defined by the width of the third conveying panel portion 162c. The mass flow rate of nuts may be increased as the width of the nuts in the conveyed stream extends over on to the first and second angled portions 162a, 162b of the conveying panel 162 until a maximum mass flow rate is reached as defined by the maximum effective conveying width W (MAX) between the first and second sidewalls 164, 166.

Figure 10A:
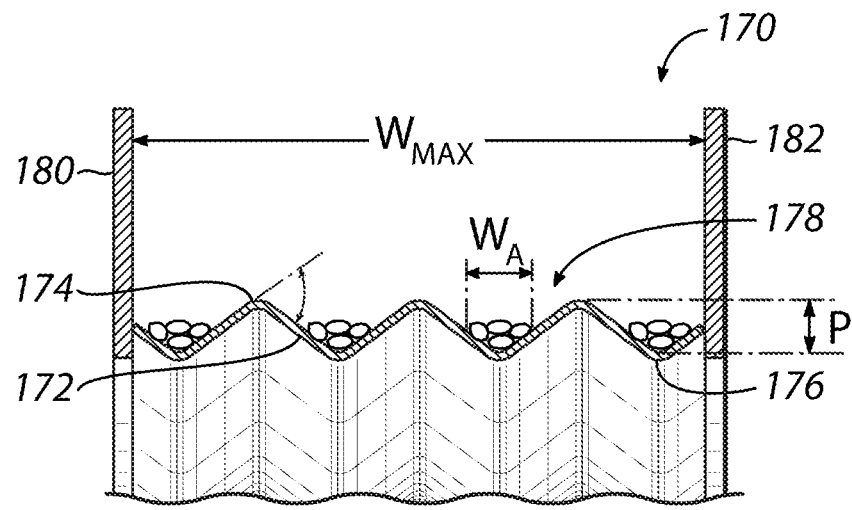
FIGS. 10A and 10B are partial cross-sectional views illustrating a fifth alternative embodiment of transfer apparatus providing variable effective conveying widths.
Figure 10B:
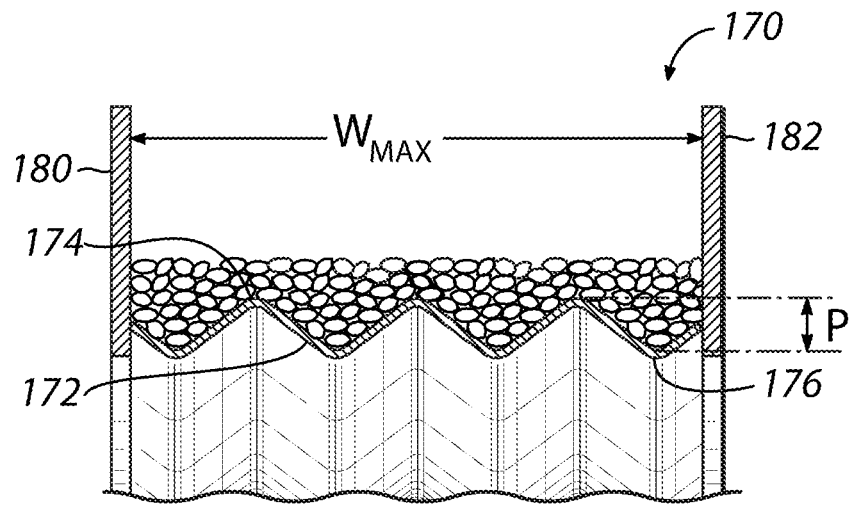

FIGS. 10A and 10B illustrate another exemplary embodiment of a transfer apparatus 170 for transferring fragile items at selective variable flow rates in accordance with the principles of the present disclosure. The transfer apparatus 170 of FIGS. 10A and 10B is similar in construction to the transfer apparatus of embodiments discussed above, particularly the transfer apparatus of FIGS. 8, 9A, and 9B, but the conveying panels 172 have undulating cross-sectional shapes as viewed along the direction of flow along the run. The variable effective widths of the conveying panels 172 of this embodiment are achieved by the undulating cross-sectional shapes of the panels 172 which form peaks 174 and troughs 176 that define at least one channel 178 in which the nuts are moved by the force of gravity in the direction of flow along the run, in a continuous stream without gaps between individual nuts and without tumbling. The undulating cross-sectional shapes may extend along the entire length of each conveying panel 172, or may extend along at least part of the length of a conveying panel 172, as may be suitable to facilitate passing the flow of nuts from one conveying panel 172, onto a turnaround, and then onto the next succeeding conveying panel 172.

With reference to FIG. 10A, each channel 178 formed in the conveying panel 172 defines a first variable width WA which may be varied according to the height of whole nuts moving along the channel 178, and which may be selected to provide a first pre-determined mass flow rate of nuts according to the formula discussed above. The total mass flow rate of nuts moving along a given conveying panel 172 will thereby be a function of the number of channels 178 in which the nuts are flowing and the variable effective width WA. The variable effective width WA for the conveying panel 172 will continue to increase as the height of nuts in the flow increases, until the height of nuts exceeds the peak height P and extends over the peaks 174 formed by the undulating cross-sectional shapes. Thereafter, the mass flow rate reaches a maximum value defined by a maximum effective conveying width W (MAX) corresponding to the distance between the side walls 180, 182, as depicted in FIG. 10B.

Figure 11A:
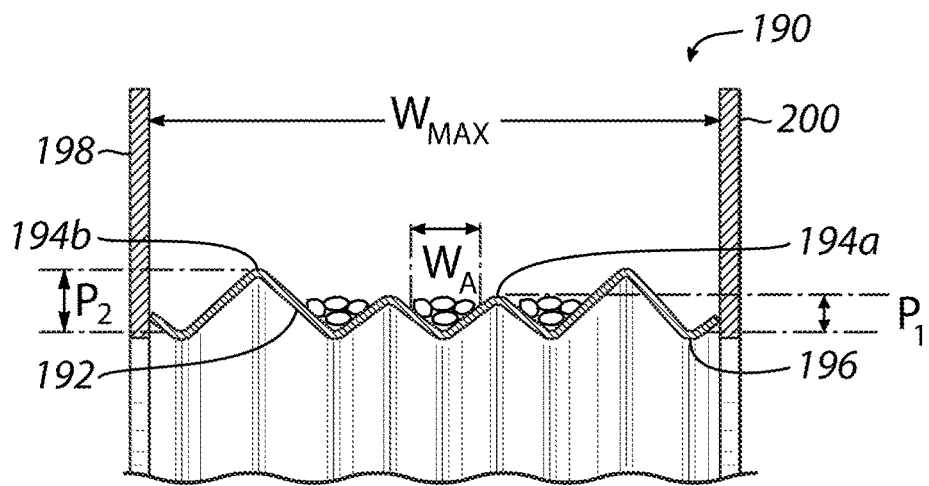
FIGS. 11A, 11B, and 11C are partial cross-sectional views, similar to FIGS. 10A-10B illustrating an additional alternative embodiment of a transfer apparatus providing variable effective conveying widths.
Figure 11B:
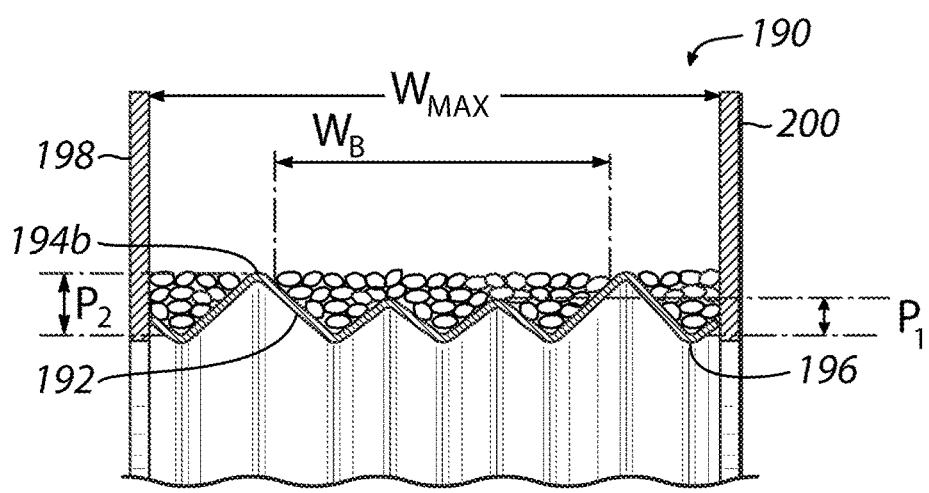
Figure 11C:
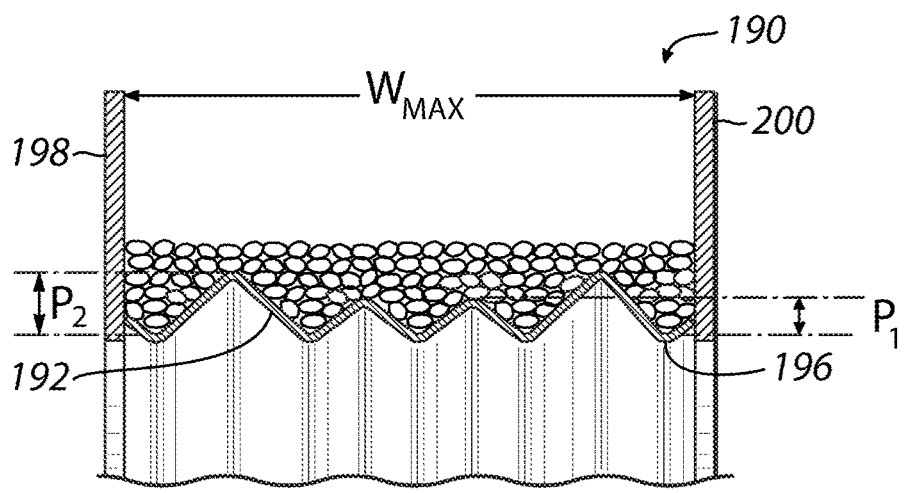

FIGS. 11A-11C illustrate yet another exemplary embodiment of a transfer apparatus 190 according to the principles of the present disclosure, wherein a variable effective conveying width is achieved by conveying panels 192 having undulating cross-sectional shapes. In this embodiment, the conveying panels 192 are configured to form peaks 194a, 194b and troughs 196 that define at least two different peak heights P1, P2. The variable effective width of the conveying panels 192 have a first value WA when nuts are directed along the run such that the height of the stream of nuts does not exceed the first peak height P1 corresponding to the first peaks 194a, as illustrated in FIG. 11A. As the height of the stream of nuts increases, the variable effective width increases to a second value WB when the height of the stream of nuts exceeds the first peak height P1 and extends over the first peaks 194a, but does not exceed the second peak height P2, as illustrated in FIG. 11B. The variable effective width may be further increased as the height of the stream of nuts further increases within the space extending between the second peaks 194b, until the variable effective width reaches a third value WMAX bounded by the sidewalls 198, 200 when the height of the stream of nuts exceeds the second peak height P2 and extends over the second peaks 194b, as illustrated in FIG. 11C.

While FIGS. 10A, 10B, and 11A-11C depict exemplary embodiments of transfer apparatus wherein variable effective widths are achieved by undulating shapes having one or two distinct peaks, it will be appreciated that variable effective widths of conveying panels for other embodiments of transfer apparatus in accordance with the principles of the present disclosure may also be achieved by selective combination of various undulating shapes as may be desired.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit and scope of the general inventive concept.

What is claimed is:

1. An apparatus for vertical transfer of whole nuts from a first elevation to a second, lower elevation, the apparatus comprising:

a run extending between an entrance and an exit, and including a plurality of alternatingly arranged conveying panels;

each conveying panel inclined to horizontal and having a variable effective conveying width; and at least one arcuate turn-around disposed between respective conveying panels;

wherein the variable effective conveying width is selected based on a predetermined mass flow rate of nuts such that whole nuts move along the run in a continuous stream without tumbling, and wherein each nut is in contact with adjacent nuts in its respective layer;

each conveying panel having an undulating cross-sectional shape along at least part of the panel length in a direction of the run, the undulating cross-sectional shape forming peaks and troughs that define at least one channel for transferring the continuous stream of nuts;

the at least one channel defining at least part of the variable effective conveying width.

2. The apparatus of claim 1, wherein;

the undulating cross-sectional shape defines at least one peak height;

the variable effective width has a first value when a height of the stream of nuts does not exceed the at least one peak height such that the nuts flow only within the at least one channel; and the variable effective width has a second value when the height of the stream of nuts exceeds the at least one peak height.

3. The apparatus of claim 2, wherein:

the undulating cross-sectional shape defines at least a first peak height and a second peak height greater than the first peak height;

the variable effective width has a first value when the height of the stream of nuts does not exceed the first peak height, such that the nuts flow only within channels formed by the first peak height;

the variable effective width has a second value when the height of the stream of nuts exceeds the first peak height, but does not exceed the second peak height; and the variable effective width has a third value when the height of the stream of nuts exceeds the second peak height.

4. The apparatus of claim 1, wherein each conveying panel is inclined at approximately 30 degrees to horizontal.

5. A method of vertically transferring whole nuts from a first elevation to a second, lower elevation, the method comprising:

providing whole nuts to a transfer apparatus having a run extending between an entrance and an exit, and including a plurality of alternatingly arranged conveying panels between the entrance and exit, each conveying panel inclined relative to horizontal and having a variable effective conveying width;

wherein the variable effective conveying width is selected based on a predetermined mass flow rate of nuts such that whole nuts move along the run in a continuous stream without tumbling, and wherein each nut is in contact with adjacent nuts in its respective layer;

each conveying panel having an undulating cross-sectional shape along at least part of the panel length in a direction of the run, the undulating cross-sectional shape forming peaks and troughs that define at least one channel for transferring the continuous stream of nuts;

the at least one channel defining at least part of the variable effective conveying width.

* * * * *